(12) United States Patent
Nickum

(10) Patent No.: US 7,003,279 B2  
(45) Date of Patent: Feb. 21, 2006

(54) PEAK TIME INDICATOR

(75) Inventor: Larry A. Nickum, Sioux City, IA (US)

(73) Assignee: Gateway Inc., Irvine, CA (US)

(*) Notice: Subject to any disclaimer, the term of this patent is extended or adjusted under 35 U.S.C. 154(b) by 343 days.

(21) Appl. No.: 10/375,877

(22) Filed: Feb. 25, 2003

(65) Prior Publication Data

US 2004/0063422 A1    Apr. 1, 2004

(51) Int. Cl.
*H04M 11/00* (2006.01)

(52) U.S. Cl. .................. 455/405; 455/406; 455/407; 455/408; 455/556.2; 379/114.01; 379/114.02; 379/132

(58) Field of Classification Search ............ 455/405, 455/406, 550.1, 432.1, 422.1, 403, 407, 408, 455/556.2; 379/114.01, 114.02, 132
See application file for complete search history.

(56) References Cited

U.S. PATENT DOCUMENTS

| | | | |
|---|---|---|---|
| 5,345,495 A | | 9/1994 | Black et al. |
| 5,950,130 A | * | 9/1999 | Coursey ................. 455/432.1 |
| 6,131,046 A | | 10/2000 | Sano et al. |
| 6,216,001 B1 | | 4/2001 | Ghirnikar et al. |
| 6,332,075 B1 | | 12/2001 | Verdonk |
| 6,434,537 B1 | * | 8/2002 | Grimes ........................ 705/40 |
| 6,438,390 B1 | | 8/2002 | Awan |
| 6,493,547 B1 | * | 12/2002 | Raith ........................ 455/405 |
| 6,577,717 B1 | * | 6/2003 | Henon ................... 379/114.01 |
| 6,731,932 B1 | * | 5/2004 | Rune et al. ............. 455/432.1 |
| 6,757,529 B1 | * | 6/2004 | Nakajima .................. 455/407 |
| 6,885,997 B1 | * | 4/2005 | Roberts ........................ 705/26 |
| 6,892,063 B1 | * | 5/2005 | Savolainen .................. 455/405 |
| 2004/0077334 A1 | * | 4/2004 | Joyce et al. ................. 455/406 |
| 2004/0123147 A1 | * | 6/2004 | White ........................ 713/201 |
| 2004/0132449 A1 | * | 7/2004 | Kowarsch ................ 455/432.1 |
| 2004/0151293 A1 | * | 8/2004 | Jensen et al. .......... 379/114.02 |
| 2004/0246908 A1 | * | 12/2004 | Guion et al. ................. 370/252 |

* cited by examiner

*Primary Examiner*—Sonny Trinh  
*Assistant Examiner*—Khai Nguyen  
(74) *Attorney, Agent, or Firm*—Jeffrey A. Proehl; Woods Fuller Schultz & Smith P.C.

(57) ABSTRACT

A method and apparatus allow use condition determination in a wireless device. A wireless interface is coupled to a processor configured to input subscriber rate plan parameters associated with a service provider. Rate plan parameters include data associated with peak time charges. Rate plan parameters are compared with current parameters to determine if peak time charges are in effect. An indication that the peak time charges are in effect is then generated.

22 Claims, 9 Drawing Sheets

US 7,003,279 B2

PEAK TIME INDICATOR

FIELD OF THE INVENTION

The present invention generally relates to the field of wireless communications devices. In particular, the present invention relates to providing an indication of peak time parameters associated with the wireless device to allow use conditions to be better determined.

BACKGROUND OF THE INVENTION

Wireless devices, such as cellular telephones, Portable Digital Assistants (PDAs), wireless interfaces for laptop computers, and the like, abound in the modem computer and communications landscape both for business and personal use. A common need shared by most telephonic, e.g. cellular, wireless devices is the need for service to be provided by a service provider.

Many wireless service providers exist today such as for example, Sprint™, Verizon™, AT&T, and the like. Wireless service providers establish service zones based on the coverage areas of equipment owned or leased for use by the service provider. The greater degree of coverage, the greater the size of the service area a subscriber may travel within without being charged for "roaming", e.g. operating in an area not serviced by the service provider.

Most modem wireless devices allow for the display of different operating conditions of the telephone based on geography and hardware conditions. For example, when "roaming" a typical wireless device may display an indication thereof to a user, or may indicate whether the user is presently operating on an analog or digital service channel. These different operating states may affect billing rates for calls and thus may provide a user with information guiding a decision to place or accept calls when roaming.

Problems arise however in that rate plans also dramatically affect the charges for a call depending on, for example, the time of day. Peak calling times, e.g. during daytime business hours, are usually charged at greater billing rates. Often times however, users are unaware or forgetful of the details of their rate plan and thus many calls are made or accepted which might otherwise be postponed until a more favorable rate time.

It would be desirable therefore in the art for a way to alert a user that peak billing charges are in effect. In this way, users can make more informed decisions regarding making or accepting calls during such periods.

SUMMARY OF THE INVENTION

Accordingly, the present invention is directed to a method and apparatus for detecting when peak time is in effect and providing an indication thereof. In providing an indication, a user of a device or system including a wireless interface may be apprised of time periods when air time will be billed at increased rates.

In one embodiment, an apparatus is provided for determining use conditions in a wireless device and may include a wireless interface and a processor coupled thereto. In accordance with various alternative exemplary embodiments, the wireless interface may be integrated into a wireless device such as for example, a cellular telephone, PDA or the like, or may be an external device or module such as for example, a PCMCIA wireless interface used with a laptop computer. The processor may be configured to input rate plan parameters associated with a subscriber to a wireless service provider associated with the wireless device. Rate plan parameters may be input from, for example, a memory, a removable memory card, a preprogrammed memory, an air interface, or a hardware interface. The rate plan parameters may include data associated with one or more peak time charges and may be compared with current parameters to determine if the peak time charges are in effect. An indication may then be generated to alert, for example, a user, that the peak time charges are in effect.

In accordance with various exemplary embodiments, the present invention may further include one or more of a display element, a sound generating element, and a vibration generating element for providing indications. The processor may be further configured to generate a visual indication on the display element, an audible indication on the sound generating element, or a tactile indication on the vibration generating element depending on which elements are available or, for example, what is desired by the user. The display element may include, for example, an LED, a lamp, CRT, a LCD display, an LED display, plasma display or the like. A visual indication may be generated on any one or more of the above identified devices and may include a blinking indication on the LED or lamp, a textual or iconic indication on the CRT, LCD, LED, plasma display, and the like. The sound generating element may include a speaker, piezoelectric element, or the like. An audible indication may be generated on any one or more of the speaker or piezoelectric element and may include a tone, a beep, a special ring, or a voice message. The vibration generating element may also include a speaker or a piezoelectric element and the tactile indication may include a vibration produced thereon.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
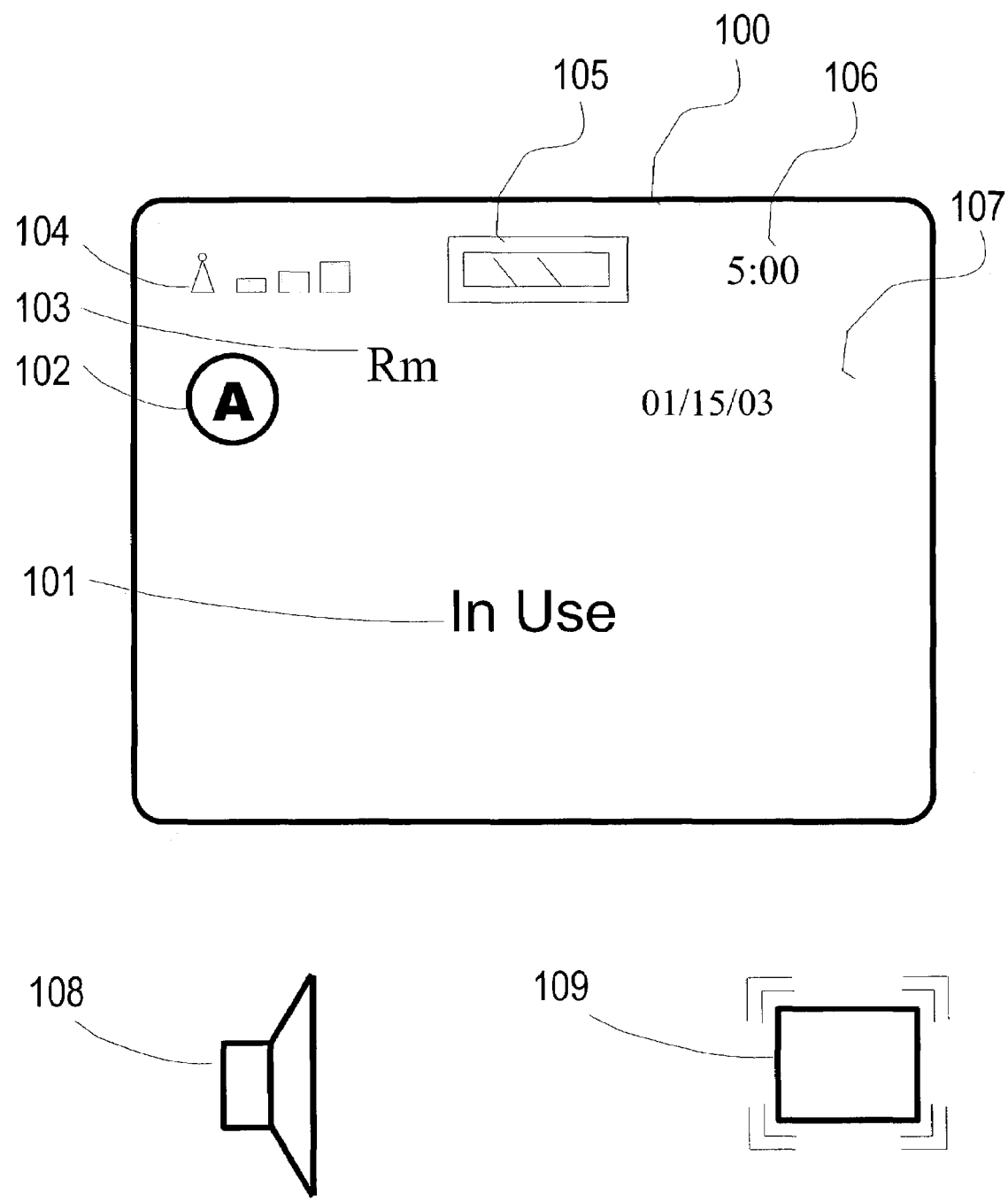
FIG. 1 is a diagram illustrating an exemplary conventional cellular telephone display showing various indications of operating conditions.

Thus the present invention addresses the abovementioned problems in the art by providing a method and apparatus for determining if peak time is in effect and providing an indication thereof to a user. It should be noted that although certain indications are provided on conventional interfaces as will be discussed briefly hereinafter, none address the problem of determining specifically if peak rates are in effect and notifying the user of same.

Thus the present invention addresses the abovementioned problems in the art by providing a method and apparatus for determining if peak time is in effect and providing an indication thereof to a user. It should be noted that although certain indications are provided on conventional interfaces as will be discussed briefly hereinafter, none address the problem of determining specifically if peak rates are in effect and notifying the user of same.

Some systems provide a wealth of data such as the system described in U.S. Pat. No. 6,435,537 B1 issued on Aug. 13, 2002 to Grimes wherein a cost accounting and management tool is provided. Service parameters such as cumulative billing for the present period, classes of service used in the current billing period and even current call charges can be downloaded during call set-up and signaling. However, problems arise in that, since information is downloaded only during call set-up, no action can be taken before a call is placed or accepted. Grimes further fails to teach or suggest providing an indication that peak charges are in effect.

In other conventional systems, such as is described in U.S. Pat. No. 6,438,390 B1 issued on Aug. 20, 2002 to Awan, the status of parameters such as service or no service, and roaming are provided during a single indication period. A first power-on period determines service, no-service, and roaming and a second power-on period determines message waiting status. It should be noted that Awan is drawn primarily to power management such that conventional status indicators are not always on, but rather pulsed within a time frame resulting in a particular probability that the indication will be seen by a user. Awan notably fails to describe providing an indication of peak time.

Still other systems, such as that described in U.S. Pat. No. 6,332,075 B1 issued on Dec. 18, 2001 to Verdonk, provide for an indication that increased billing rates apply to incoming calls based on distinctive ringing. It should be noted however that Verdonk is drawn to increased billing rates associated with roaming and toll charges and fails to describe providing an indication to a user that peak charges are in effect.

Indication of service levels is described in U.S. Pat. No. 6,216,001 B1 issued on Apr. 10, 2001 to Ghirnikar et al. (hereinafter "Ghirnikar") however, service level indication is to be distinguished from peak time indication. The service levels described in Ghirnikar relate to a quality metric associated with the forward and reverse channels and not to the application of peak time charges to a subscriber based on a rate plan. Similarly, an indication is described in U.S. Pat. No. 6,131,046 issued on Oct. 10, 2000 to Sano et al. (hereinafter "Sano") by way of an icon or the like relating to the availability of a communication channel. Further, Sano describes disabling the dialing keys when the quality of radio service in an area prevents communication. Sano fails however to describe providing an indication that peak time charges are in effect.

Referring to FIG. 1., a conventional wireless telephone interface 100 is shown. A primary indication provided on interface 100 is use status indicator 101, shown in the diagram in a state wherein the telephone is "In Use", e.g a call is set up or being set up. Channel indicator 102 shows the status of the service channel which, in the example shown, is indicating that an "A" or analog service channel is in use. It will be appreciated by those skilled in the art that such an indication can alternatively show that a "D" or digital service channel is in use, or alternate "A" or "B" service channels are in use based on factors such as remoteness from or proximity to a transmitter of a particular type, or the like. Other indications typically provided on a conventional wireless telephone interface may include signal strength indicator 104, batter power indicator 105, time indicator 106, date indicator 107, speaker 108, and vibration element 109 having obvious applications as will be appreciated by those of skilled in the art. Reference will now be made in detail to the presently preferred embodiments of the invention, examples of which are illustrated in the accompanying drawings.

Figure 2:
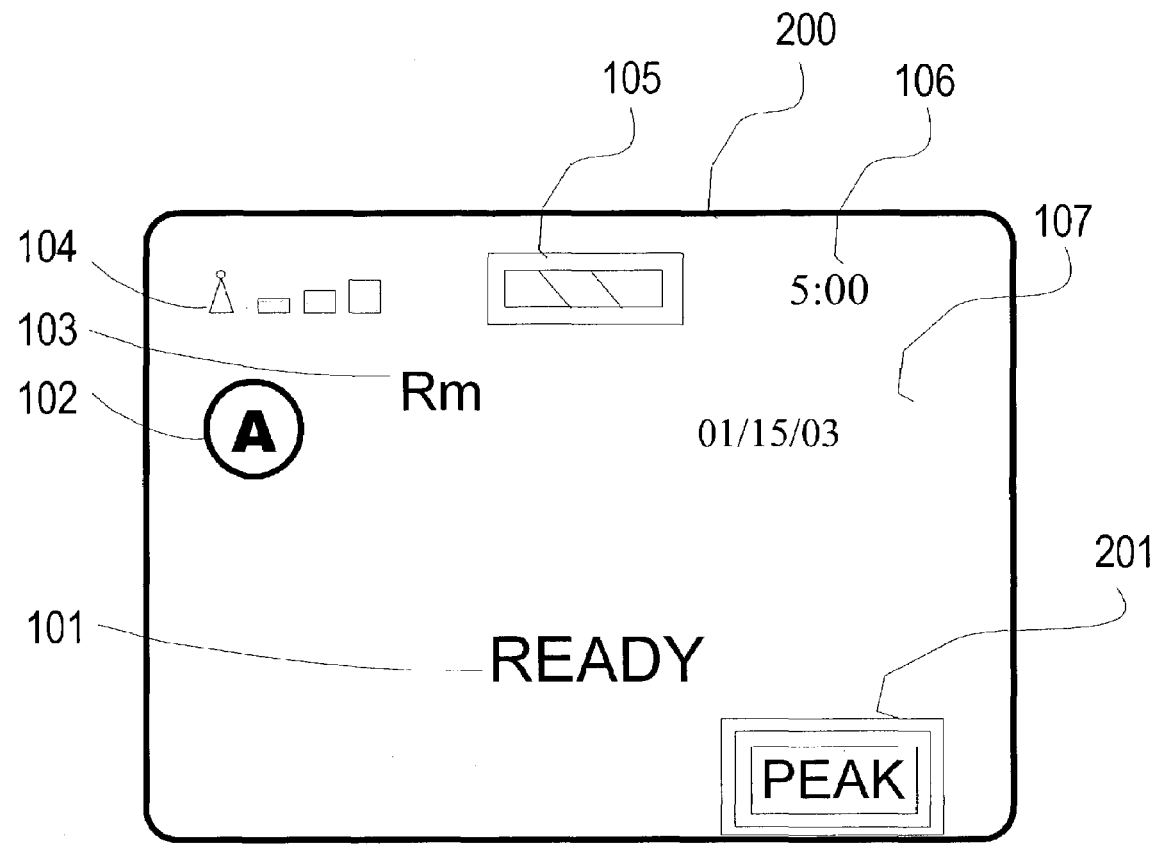
FIG. 2 is a diagram illustrating an exemplary cellular telephone display showing various indications of operating conditions including a peak time indication in accordance with various exemplary embodiments of the present invention.
Figure 2:
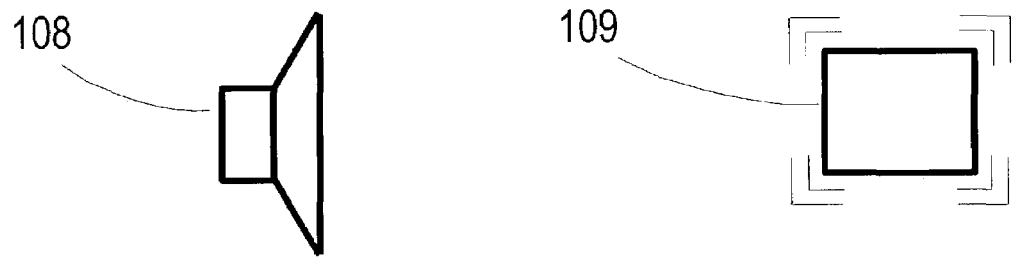

FIG. 2 illustrates wireless telephone interface 200 in accordance with various exemplary embodiments of the present invention. In the diagram, status indicator 101 shows "READY", e.g. the phone is powered on, but there is no call in progress. Such a scenario is illustrative of various advantages associated with the present invention. In such a state, it can be seen that PEAK time detector 201 is displayed in telephone interface 200, alerting a user to the fact that, based on a comparison of data associated with a subscriber rate plan, as will be described in greater detail hereinafter, peak charges are in effect for any calls placed or accepted. It should be noted that although peak indicator 201 is shown as a textual display on a user interface screen, the indication may be provided by numerous alternative means including, for example, an LED, a vibration generating element, a tone generating element, or the like. Accordingly, the user may choose to accept an incoming call, divert an incoming call to voice mail or messaging, or may choose whether to originate a call or not depending on whether peak charges are in effect. Since peak charges are determined by rate plan information associated with an individual service provider it is important that the rate plan information be obtainable from the cellular network including visited cell call processing nodes or alternatively may be pre-programmed into the wireless device when signing up with a service provider.

Figure 3:
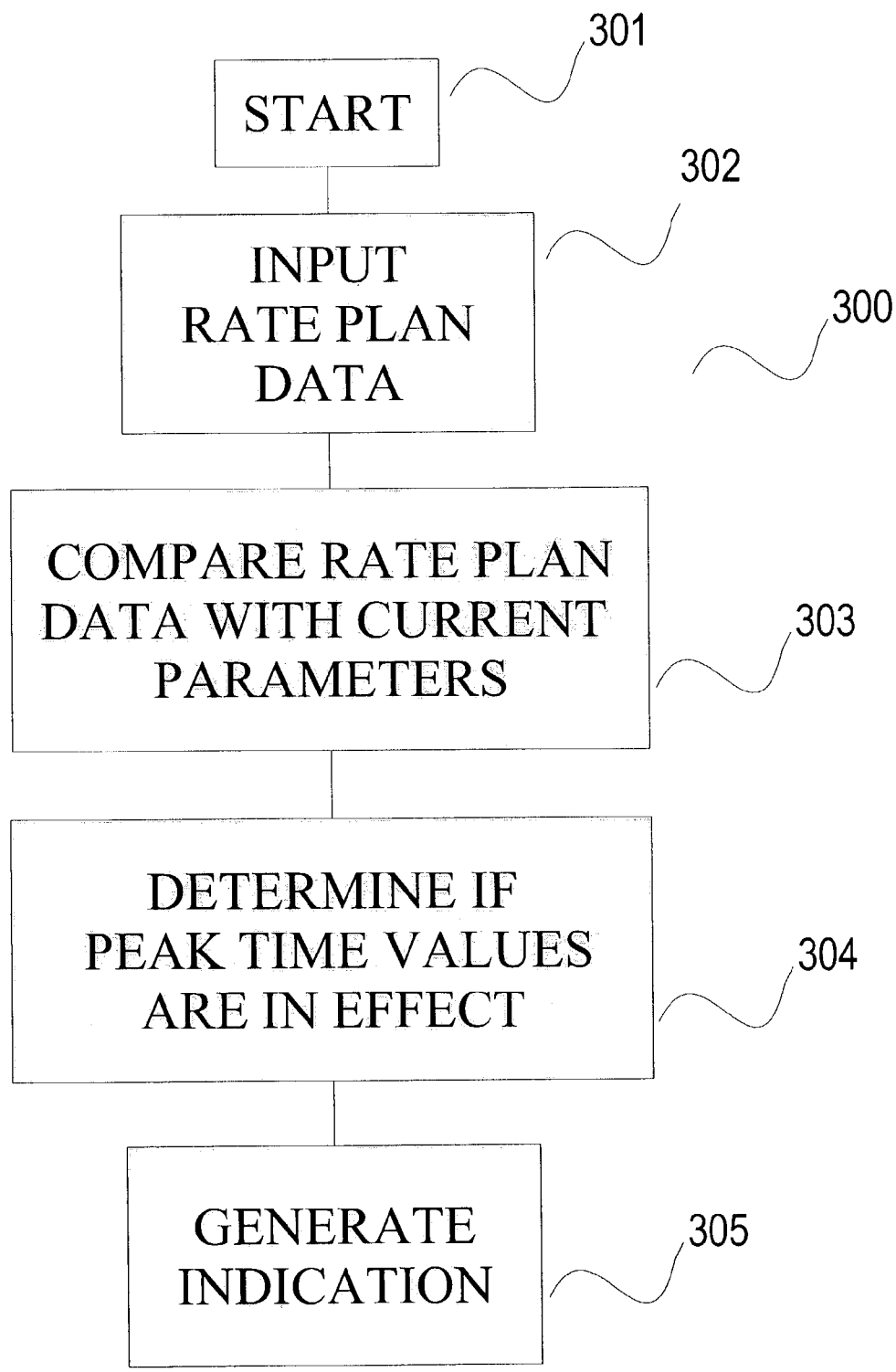
FIG. 3 is a block diagram illustrating exemplary steps in determining and providing an indication of rate plan parameters in accordance with various exemplary embodiments of the present invention.

Thus, in accordance with various exemplary embodiments of the present invention, rate plan information may be obtained and processed as shown in FIG. 3. In parameter upload scenario 300, an exemplary sequence may begin at start block 301. In block 302, rate plan data may be may be input or otherwise uploaded into, for example, a local memory or a processor memory from the air interface or from a storage device such as for example, a non-volatile RAM, memory card, removable memory media or the like to be described in greater detail hereinafter. Rate plan data may then be compared, in block 303, with present parameters such as for example, time and date to establish the correspondence between rate plan time and dates and present time and dates. Such comparison may lead to a determination, as shown in block 304, whether present time parameters are within peak time parameters. If the present parameters are within the peak time parameters, then an indication may be generated, as shown in FIG. 3., and may be visual, audio, or tactile as previously described. It should be noted that rate plan data as input or otherwise uploaded in block 302, may, if loaded from an external source over an air interface, remote interface or the like, may be stored locally in a non-volatile storage device associated with the wireless device or associated processor such that the next time the device is powered on, the information is already available. It should be noted however, that if rate plan information is subject to periodic modification, new plan information should be loaded as soon as possible after any changes so that input data is up to date. In view of the fact that the data may change periodically a verification process may preferably be included which compares stored rate plan data with updated rate plan data obtained, for example, from an air interface.

Figure 4:
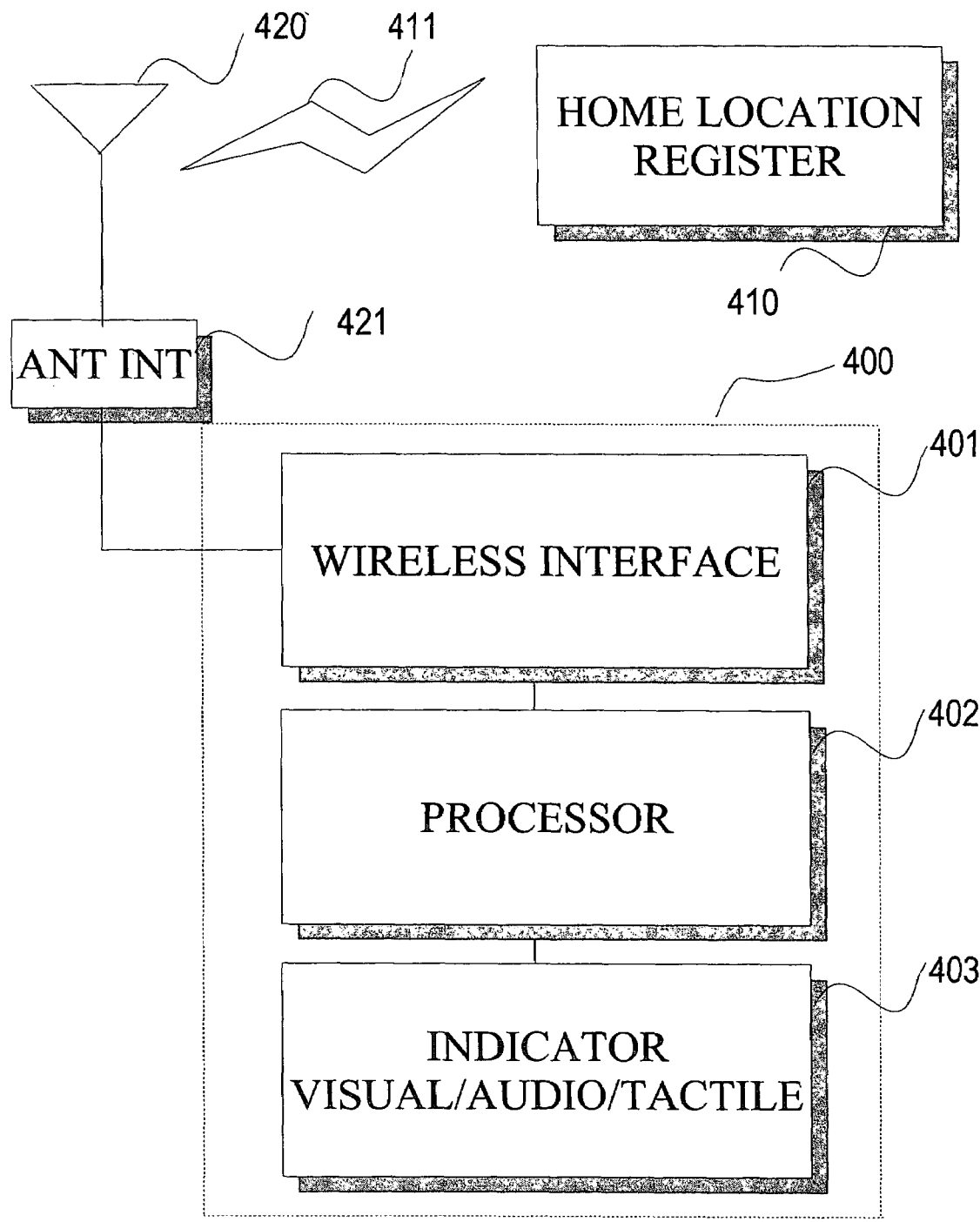
FIG. 4 is a diagram of an exemplary system in accordance with various exemplary embodiments of the present invention showing a wireless interface, processor, and indication block in the same unit.

It should also be noted that the indication providing apparatus and method associated with various exemplary embodiments of the present invention can be integrated within for example a cellular telephone, PDA, or the like or may be used in connection with a computer such as a desktop or laptop computer where an external wireless device may be connected therewith. As shown in FIG. 4, device 400 includes wireless interface 401, processor 402, and indicator 403. At any suitable time when device 400 is powered on, a connection with a wireless network management node such as, for example, HLR (Home Location Register) 410, or alternatively a different type of network management node such as, for example, an Visited Location Register (VLR), a Mobile Switching Center (MSC), a Call Processing Node (CPN), or the like, may be established over air interface 411 by way of antenna 420 and antenna interface 421. Once such as connection is established such as for example, during power-up, rate plan information may be obtained.

Figure 5:
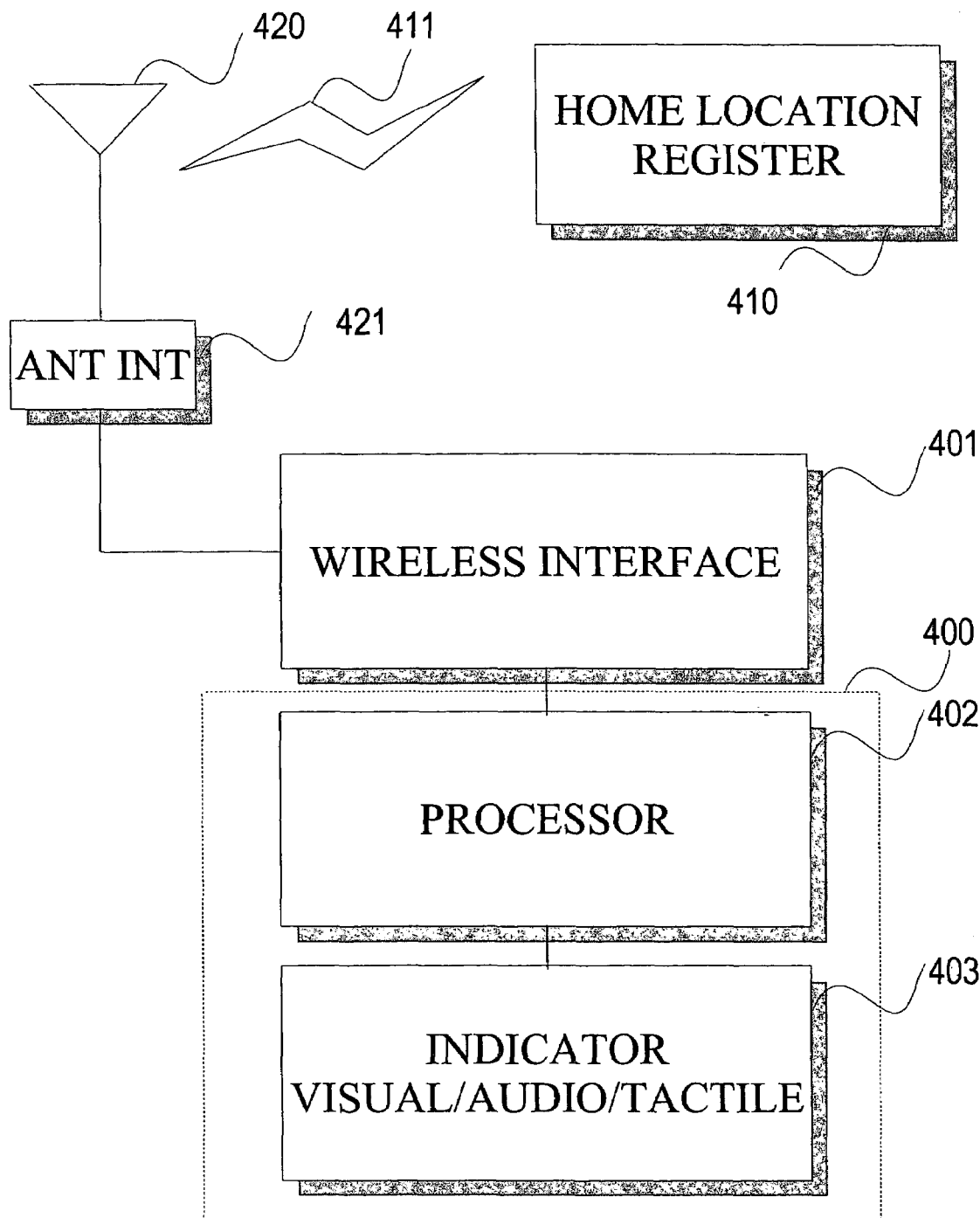
FIG. 5 is a diagram of an exemplary system in accordance with various exemplary embodiments of the present invention showing a processor, and indication block in the same unit with a separate wireless interface.

In accordance with various alternative exemplary embodiments, wireless interface 401 may be an external device as shown in FIG. 5. Device 400 may include processor 402 and indicator 403, while wireless interface 401 may be an external device coupled to device 400. It should be noted that an indication may be generated, for example, within wireless interface 401 and sent to indicator 403, or alternatively rate information may be input from wireless interface 401 and comparison and determination of peak time may be performed on processor 402 and an indication generated internal to device 400. As will be appreciated by those skilled in the art, in the present exemplary embodiment, device 400 may be a personal computer such as a laptop or desktop or the like, and wireless device 401 may be an external wireless interface device such as a wireless PCMCIA device, or a wireless device configured to connect with a processor over a USB port, or the like. Once it is determined, either within device 400 or within wireless interface device 401, that the present parameters are within the peak time parameters downloaded or otherwise input as previously described, indicator 403 may generate a tone using, for example, a speaker, piezoelectric device, or the like, may generate a visual indication such as an icon on a display as shown for example in FIG. 2, a LED, or the like, or may vibrate using, again, a piezoelectric transducer or the like.

Figure 6:
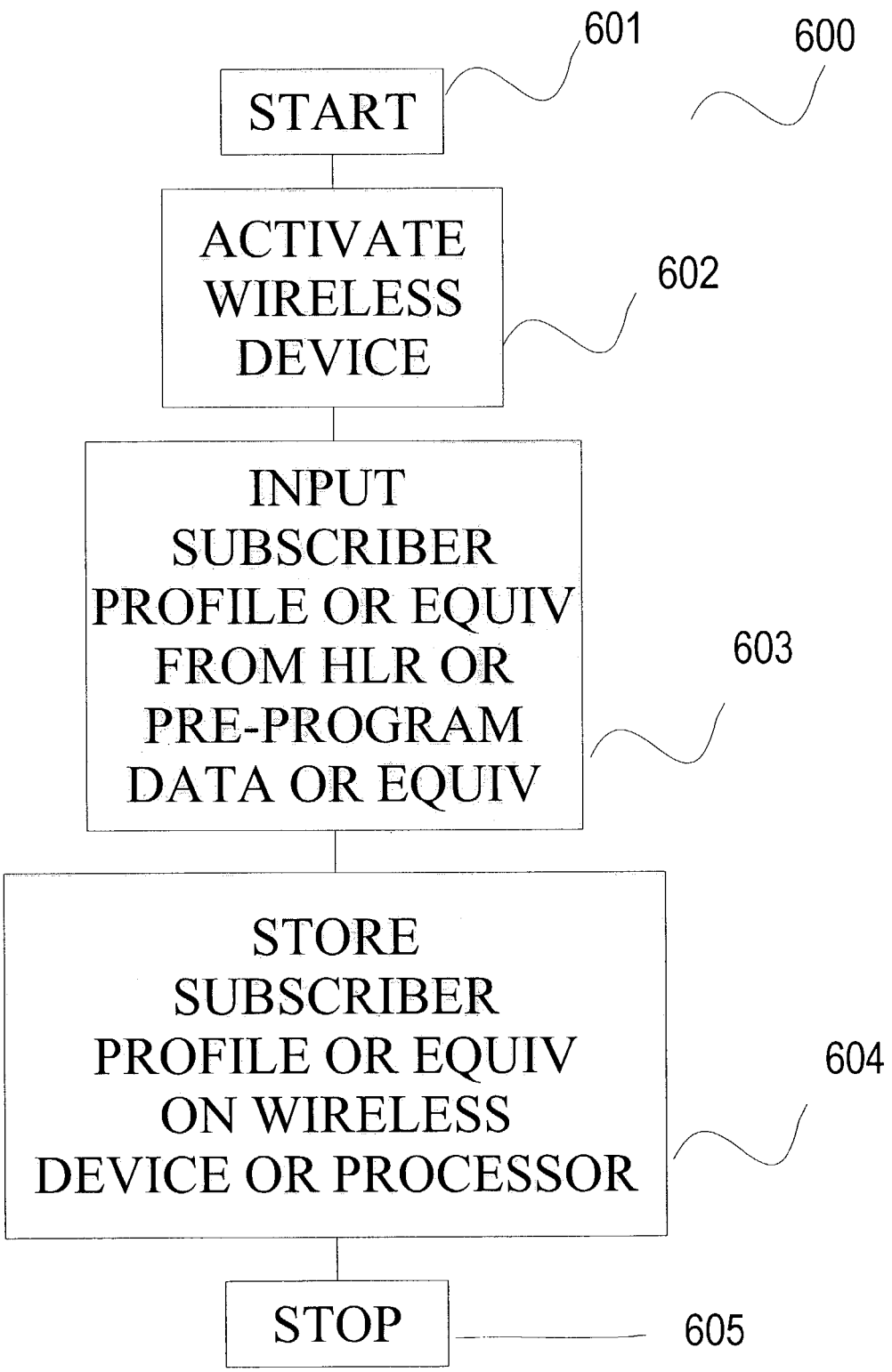
FIG. 6 is a block diagram illustrating exemplary steps in determining rate plan parameters in accordance with various exemplary embodiments of the present invention.

As previously described, rate plan information may be input or otherwise uploaded or downloaded from an air interface, local memory, removable memory device, or any suitable storage media as would be appreciated by one skilled in the art. In FIG. 6, a block diagram illustrates exemplary scenario 600 in accordance with various exemplary embodiments of the present invention. After sequence start 601, a wireless device may be activated at 602 through a power-up sequence or the like. It will be appreciated by one skilled in the art that as part of the power up sequence, a standardized signal exchange takes place depending on the service provider and service standard, e.g. GSM, CDMA, or the like, wherein a forward and reverse channel are established between the device and the nearest transmitter or transmitters, as well as the establishment of transmit and receive power levels and the like. During the course of the power-up sequence, subscriber profile information or equivalent rate plan information may be input from an HLR, VLR, or other CPN as previously described. The information may then be stored as in block 604 in a memory device associated with the wireless device, the processor or alternatively may be pre-programmed into a local memory on the wireless device or processor and the sequence may stop at block 605.

Figure 7:
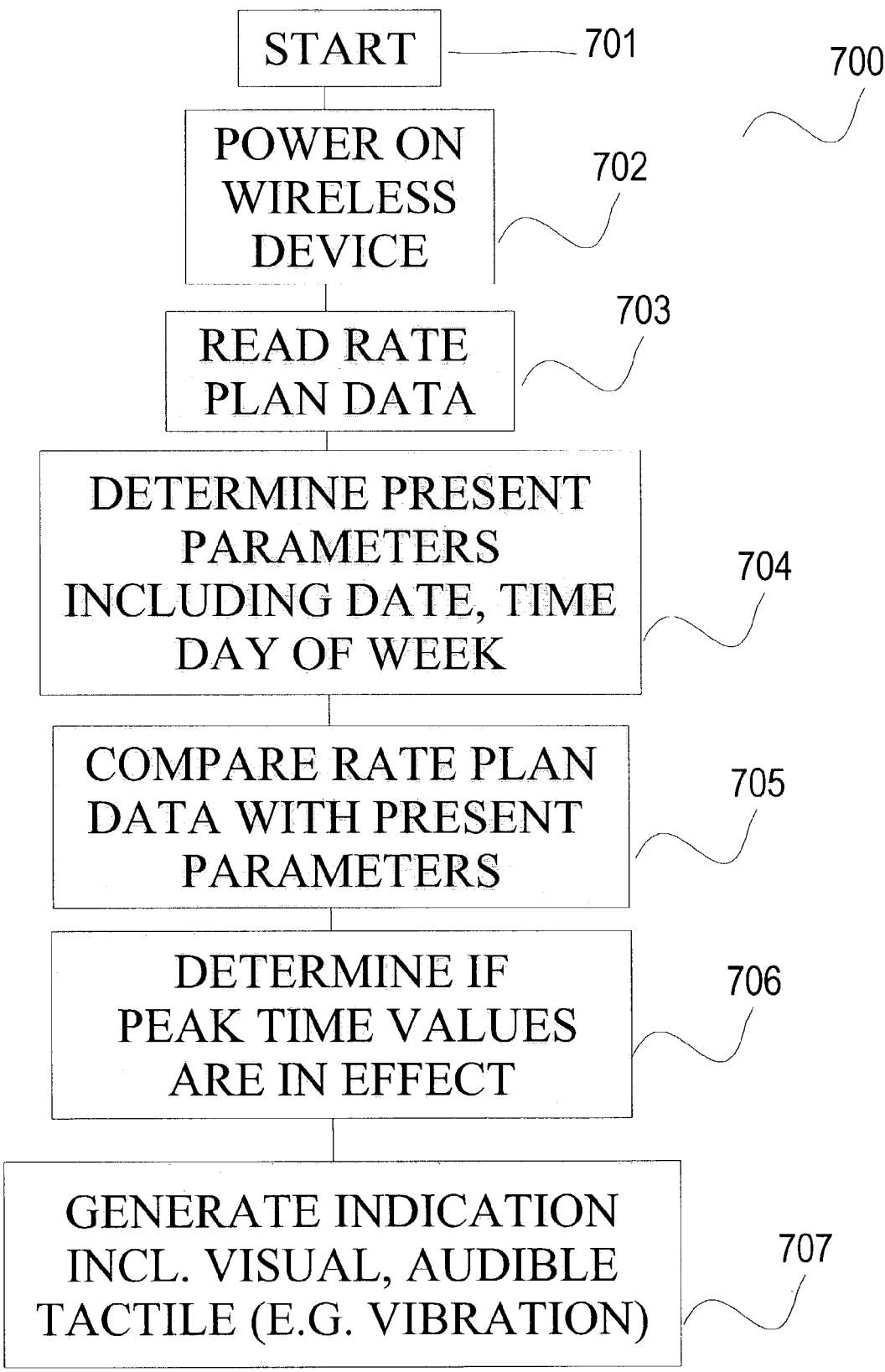
FIG. 7 is a block diagram illustrating exemplary steps in reading and determining rate plan parameters and providing an indication in accordance with various exemplary embodiments of the present invention.

Once data is stored, it may be used in accordance with various exemplary embodiments, for example, as illustrated in FIG. 7. Scenario 700 begins at start block 701 where, at block 702, an exemplary wireless device is powered on. It should be noted that sequences may be executed at power on as previously described, for example, in connection with scenario 600, or a standard power on sequence where rate plan information has been stored, is obtained during activation, or is otherwise available. Accordingly, such rate plan data may be read at block 703. After the present parameters are determined including, for example, the date, time, and day of week, and like parameters typically associated with rate plan information in block 704, the present parameters may be compared with the rate plan information read in block 703. Based on the comparison, a determination may be made whether peak values are in effect in block 706. It will be appreciated that "peak" values may refer to, for example, the highest values charged in a rate plan. In many plans, there is a peak rate during peak calling hours, and a low rate at all other times. If however, rates are graduated, e.g. rate values are highest at peak times and fall to progressively lower levels over the course of the calling day, then the determination may be made for the particular level in effect at the time including the peak levels. Once the determination is made, an indication may be provided in block 707 including visual, audible, and/or tactile as previously described. It will further be appreciated by those skilled in the art that an indication in accordance with various exemplary embodiments of the present invention may be provided in a variable manner to coincide with various or graduated rates including peak rates. For example, if an indication is provided by way of an icon, the icon may have a level bar associated therewith which may be illuminated in proportion to the level of charges in effect. Further, if an audible indication is provided by way of a piezoelectric transducer or speaker, or the like, the audible indication may be provided by one or more tones which indicate the degree of peak charges in effect, or in accordance with various alternative exemplary embodiments, an audible voice message may be generated and played. Depending on the degree of sophistication of the device with which the present invention is associated, more sophisticated indications may be provided as will be described in greater detail hereinafter.

Figure 8:
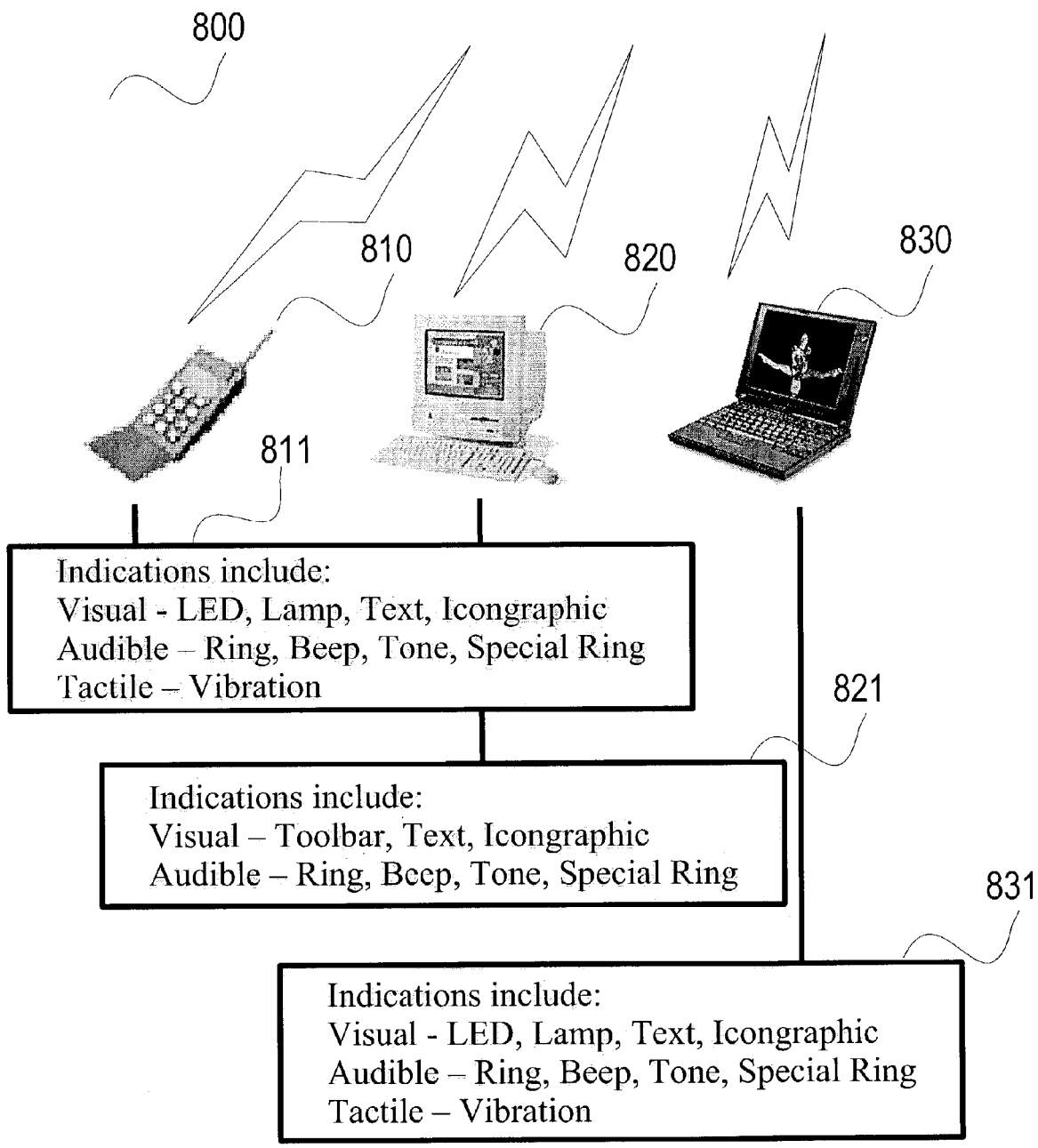
FIG. 8 is a diagram illustrating several exemplary devices using peak time indication in accordance with various exemplary embodiments of the present invention.

As shown in FIG. 8, scenario 800 includes three exemplary devices in accordance with various exemplary embodiments of the present invention which are capable of wireless communication and may provide indications of peak time charge levels. Wireless telephone 810, as will be appreciated by one skilled in the art, typically has an integrated wireless interface, and may generate indications including, for example, as shown in box 811, visual, audible, and tactile indications. The visual indications may include an LED, lamp, or the like and/or a textual indication may be generated on the user interface, and/or an icon may be generated, which text and/or icon may be displayed on a display device such as for example, an LCD display, a LED display, a plasma display or the like. One of skill in the art will further appreciate that, particularly on a more sophisticated display device, the visual indications may further include a more sophisticated visual interface showing a clock face, the present time and an overlay showing peak time periods. Alternatively, such an interface could be invoked when an indicator icon is "clicked", for example, with an input device. An audible indication may be provided by a speaker or piezoelectric transducer capable of generating energy in the audio band. Such devices may generate one or more tones or beeps indicating peak time is in effect or alternatively what level of charges are in effect including peak time. In more sophisticated devices, a voice recording or synthesized voice message may be generated as an indication containing the level of peak charges in effect at the time of either an incoming call or an attempted outgoing call. Tactile indications may also be provided by a piezoelectric transducer or the like capable of generating sufficient mechanical vibrations to alert the user that a particular peak charge level is in effect.

Desktop Personal Computer (PC) 820, in accordance with various exemplary embodiments of the present invention may also be equipped with a wireless interface device either internal or external to PC 820, including for example, a wireless LAN interface although not all wireless LAN interfaces will be subject to wireless service charges involving peak rate charges. In any case, it is presumed that the wireless interface device provides wireless connectivity for PC 820 through, for example, a service provider as previously described. It should be noted that many of the same type of indications can be provided for PC 820 as described hereinabove for wireless telephone 810. For example, visual and audible indications may be provided, although tactile indications would be less practical for PC 820. Visual indications may include an LED located on the display, processor or keyboard, or may include text on the user interface, an icon, and the like. One of skill in the art will appreciate that because of the generous display capabilities typically available for PC 820, the visual indications may further include a more sophisticated visual interface showing a clock face, the present time and an overlay showing peak time periods. Alternatively, such an interface could be invoked when an indicator icon is "clicked", for example, with an input device such as a mouse or the like. An audible indication may be provided by a system speaker capable of generating energy in the audio band. One or more tones or beeps may be generated by the system speaker indicating peak time is in effect or alternatively what level of charges are in effect including peak time. A voice recording or synthesized voice message may further be generated as an indication containing the level of peak charges in effect at the time of either an incoming call or an attempted outgoing call.

Laptop 830, in accordance with various exemplary embodiments of the present invention may also be equipped with a wireless interface device such as a PCMCIA card with wireless capabilities. Alternatively, wireless capability may be built into laptop 830 or may be provided through a stand alone external device which can be connected to laptop 830 through, for example, a serial interface such as a Universal Serial Bus (USB) port. In any case, wireless capability is provided for laptop 830 through, for example, a service provider as previously described. It should be noted that many of the same type of indications can be provided for laptop 830 as described hereinabove for wireless telephone 810, and PC 820. For example, visual, audible, and tactile indications may be provided. Visual indications may include an LED located on the display, processor or keyboard, or may include text on the user interface, an icon, and the like. Again, because of the generous display capabilities typically available for laptop 830, the visual indications may further include a more sophisticated visual interface showing a clock face, the present time and an overlay showing peak time periods. Alternatively, such an interface could be invoked when an indicator icon is "clicked", for example, with an input device such as a mouse or the like. An audible indication may be provided by a system speaker or the like capable of generating energy in the audio band. One or more tones or beeps may be generated indicating peak time is in effect or alternatively indicating what level of charges are in effect including peak time. A voice recording or synthesized voice message may further be generated as an indication containing the level of peak charges in effect at the time of either an incoming call or an attempted outgoing call. Tactile indications may also be provided by equipping laptop 830 with, for example, a piezoelectric transducer or the like capable of generating sufficient mechanical vibrations to alert the user that a particular peak charge level is in effect.

Figure 9:
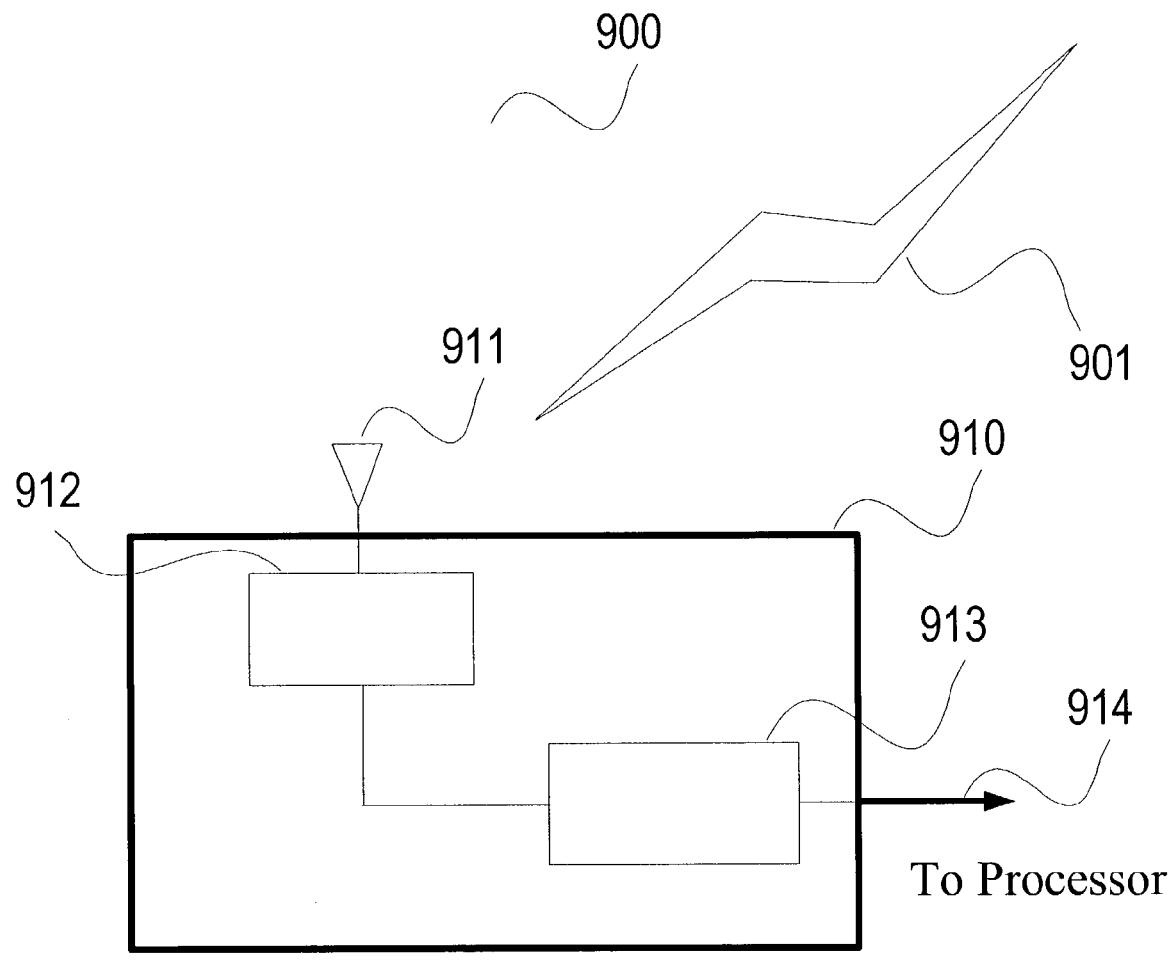
FIG. 9 is diagram illustrating an external wireless interface device for providing peak time indication in accordance with various exemplary embodiments of the present invention.

It will be appreciated by one of ordinary skill in the art that, as described in the case of laptop 830 and PC 820, an external wireless device provides a wireless interface through a wireless service provider. FIG. 9 illustrates an exemplary version of such a peripheral wireless device. Therein, scenario 900 shows external wireless device 910 connecting to a service provider through air interface 901 and antenna 911. Antenna interface 912 may provide raw signal processing and may be coupled to processor 913. It is important to note that external wireless device 910 may contain a majority of the capabilities for wireless communications and may simply provide a data interface 914 to a host processor such as, for example, PC 820 or laptop 830. Alternatively, external wireless device 910 may provide an indication that peak charges are in effect and communicate to a host processor that an indication should be provided. It is preferable however to have the intelligence associated with making the determination that peak charges are in effect reside on the primary processing device such as, for example, PC 820, laptop 830, or the like, e.g. the device which will be providing the indication in accordance with various exemplary and alternative exemplary embodiments of the present invention.

It is believed that the peak time indicating apparatus of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for determining use conditions in a wireless device, the method comprising:

inputting on the wireless device rate plan parameters associated with a subscriber to a wireless service provider for the wireless device, the rate plan parameters including data associated with one or more peak time charges, comparing the inputted rate plan parameters with present temporal parameters, determining, on the wireless device, if the one or more peak time charges are in effect based on the comparison, and generating an indication on the wireless device that the one or more peak time charges are in effect based on the determination.

2. The method of claim 1, wherein the wireless plan parameters include at least two graduations of peak time charges, and the indication is different for each of the at least two graduations of peak time charges.

3. The method of claim 1, wherein the step of generating an indication includes generating a visual indication; and wherein the step of generating a visual indication further includes generating one or more of: a LED display, a lamp display, a textual display, and an icon.

4. The method of claim 1, wherein the step of generating an indication includes generating an audible indication; and wherein the step of generating an audible indication further includes generating one or more of: a tone, a beep, a special ring, and a voice message.

5. The method of claim 1, wherein the step of generating an indication includes generating a tactile indication; and wherein the step of generating a tactile indication further includes generating a vibration.

6. The method of claim 1, wherein the step of inputting rate plan parameters includes inputting the rate plan parameters from one or more of: an air interface, a removable memory card, a pre-programmed memory, a hardware interface.

7. The method of claim 1, wherein the rate plan parameters include billing charges associated with one or more of: date, time, and day of week, and wherein the present temporal parameters include one or more of: date, time, and day of week.

8. The method of claim 1, wherein the indication that the one or mare peak time charges are in effect includes a visual indication, the visual indication comprising a clock face, a representation of the present time, and an overlay showing peak time periods.

9. An apparatus for determining use conditions in a wireless device, the apparatus comprising:

a wireless interface on the wireless device; and a processor on the wireless device being coupled to the wireless interface, the processor configured to:

input rate plan parameters associated with a subscriber to a wireless service provider for the wireless device, the rate plan parameters including data associated with one or more peak time charges, compare on the wireless device the inputted rate plan parameters with current temporal parameters, determine on the wireless device if the one or more peak time charges are in effect based on the comparison, and generate on the wireless device an indication that the one or more peak time charges are in effect based on the determination.

10. The apparatus of claim 9, further comprising one or more of: a display element, a sound generating element, a vibration generating element, and wherein the processor, in generating an indication, is further configured to generate one or more of: a visual indication on the display element, an audible indication on the sound generating element, and a tactile indication on the vibration generating element.

11. The apparatus of claim 10, wherein the display element includes one or more of: an LED, a lamp, CRT, a LCD display, an LED display, and plasma display.

12. The apparatus of claim 10, wherein the visual indication includes one or more of: a blinking indication, a textual indication, and an icon indication.

13. The apparatus of claim 10, wherein the sound generating element includes one or more of: a speaker, and a piezoelectric element.

14. The apparatus of claim 10, wherein the audible indication further includes generating, on the sound generating element, one or more of: a tone, a beep, a special ring, and a voice message.

15. The apparatus of claim 10, wherein the vibration generating element includes one or more of: a speaker, and a piezoelectric element.

16. The apparatus of claim 10, wherein the tactile indication further includes generating, on the vibration generating element a vibration.

17. The apparatus of claim 10, further including one or more of: a memory, a removable memory card, a pro-programmed memory, and wherein the processor, in inputting rate plan parameters, is further configured to input the rate plan parameters from one or more of: the memory, the removable memory card, and the preprogrammed memory, and is further configured to input to input the rate plan parameters from one or more of: an air interface and a hardware interface.

18. The apparatus of claim 10, wherein the rate plan parameters include billing charges associated with one or more of: date, time, and day of week, and wherein the present parameters include one or more of: date, time, and day of week.

19. The apparatus of claim 10, wherein the processor includes one of: a wireless telephone, a Personal Digital Assistant, a Personal Computer, and a laptop computer.

20. The apparatus of claim 10, wherein the wireless interface includes a PCMCIA wireless device, a wireless telephone, a wireless LAN interface, and an integrated wireless interface.

21. The apparatus of claim 9, wherein the rate plan parameters include at least two graduations of peak time charges, and the indication generated is different for each of the at least two graduations of peak time charges.

22. The apparatus of claim 9, wherein the indication that the one or wore peak time charges includes a visual indication, the visual indication comprising a clock face, a representation of the present time, and an overlay showing peak time periods.

* * * * *